United States Patent Office 3,383,311
Patented May 14, 1968

3,383,311
GRAPHITE LUBRICANT
Aleksander Jerzy Groszek, London, England, assignor to
The British Petroleum Company Limited, London, England, a corporation of England
No Drawing. Filed Sept. 21, 1966, Ser. No. 586,347
Claims priority, application Great Britain, Sept. 24, 1965, 40,702/65
9 Claims. (Cl. 252—29)

This invention relates to a novel graphite product of a particular physical form in which it possesses new and useful properties.

It is well known to grind graphite in air using, for example, rotary or vibratory ball mills. It is also known to grind graphite in water, which water-ground graphite can then be incorporated in oils to form dispersions.

According to the invention, a novel graphite is provided which is prepared by grinding natural or synthetic graphite in a low boiling point, low viscosity, low surface tension organic liquid. For convenience, the graphite product in this way will hereinafter be called "oleophilic" graphite to distinguish it from the untreated starting material. "Oleophilic" graphite will absorb n-dotriacontane in preference to n-butanol, in contrast to the untreated starting material.

Both natural and synthetic graphite are well-known and readily available. The synthetic material is, for example, produced from petroleum coke by heating to from 1000° to 3000° C. in a vacuum or inert gas. Typically it contains from 95 to 100% wt. carbon. The natural material may have a slightly lower carbon content than this and usually has a larger crystal size.

Satisfactory products can be obtained by grinding in most organic liquids but it is desirable to use one the bulk of which can be easily removed from the oleophilic graphite. Those liquids distilling below 500° C. and having a viscosity below 600 centistokes at 100° F. (38° C.) are therefore preferred. Liquids having a surface tension below 72 dynes/cm., preferably from 10 to 40 dynes/cm., at 25° C. are preferred.

Suitable organic liquids are lower molecular weight hydrocarbons, including straight-chain or branched-chain, saturated or unsaturated alkyl, saturated or unsaturated, substituted or unsubstituted, cycloalkyl, and substituted or unsubstituted aromatic compounds. Examples of such compounds are n-heptane, octene-2, 2,2,4-trimethylpentane, cyclohexane, benzene or toluene. Branched alkyl compounds are particularly preferred. Other suitable oganic liquids are those compounds which contain fluorine, chlorine, or phosphorus and chlorine, for example, carbon tetrachloride.

Other suitable organic liquids are the polar oxygen compounds such as isopropyl alcohol. Silicone fluids can also be used.

For best results, the amount of graphite in the graphite/organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by nitrogen adsorption) of from 20 to 800, preferably from 30 to 200, square metres per gram is obtained. Usually this can be achieved by grinding at normal temperatures for the required period but the temperature of the mixture may be artificially increased if desired, for example, up to 400° C. In this case, liquids which has viscosities up to 600 centistokes at 100° F. (38° C.) may be used, for example, mineral lubricating oils, ranging from "spindle" oils to "bright stocks."

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite. A suitable procedure is to fill the mill with the liquid, add half the balls, then the graphite and finally the rest of the balls.

When using a ball mill, it is of course desirable to use balls made of a material which does not react with the graphite and which does not wear unduly during the grinding. Vibratory ball mills usually contain steel balls and these are suitable for the present purpose. It is preferred to use a hard grade of steel for the balls.

A magnetic filter can be used to remove small steel particles from the slurry. A circulatory system can also be used wherein the slurry is pumped through an external magnetic filter and then returned to the mill.

A suitable vibratory ball mill is sold under the trade name "Megapact," manufactured by Pilamec Limited. The grinding effect is produced by the impact of the balls upon the graphite and upon each other.

The slurry of oleophilic graphite can be separated from the balls by sieving or by displacement by another liquid and sieving.

If a relatively high boiling organic liquid is used for grinding it is preferred to displace this liquid by a low boiling liquid. This liquid can then be removed by boiling from the slurry. It is preferred to use vigorous boiling.

It is also possible to filter the slurry to obtain a filter cake of oleophilic graphite.

In either case it is preferred to remove the last traces of solvent by heating the filter cake in a vacuum oven for several hours, for example, at 100° C. and at 1 mm. mercury.

The following examples serve to illustrate the invention.

Example 1

Two oleophilic graphite products according to the invention were prepared from synthetic graphite as described below. Table 1 below compares the properties of these products with a ground graphite of similar surface area prepared by grinding in air and with a highly adsorbent activated charcoal of very high surface area.

TABLE 1

| Adsorbent | BET Surface Area, m.²/g. | n-Dotriacontane adsorbed from 0.1% solution in n-Heptane. mg./m.² | n-Butyl alcohol adsorbed from 0.1% solution in n-Heptane, mg./m.² |
|---|---|---|---|
| A—Graphite ground in Megapact vibration mill for 80 minutes in n-heptane | 70 | 0.44 | 0.03 |
| B—Graphite ground in Megapact vibration mill for 160 minutes in n-heptane | 68 | 0.44 | 0.03 |
| P—Graphite ground in Megapact vibration mill for 35 minutes in air | 68 | 0.38 | 0.10 |
| Q—Highly adsorbent activated charcoal | 1,345 | 0.07 | |

It will be seen that the two oleophilic graphies (A and B) prepared in accordance with the invention have a higher adsorptive capacity for n-paraffins than a graphite (P) of similar surface area prepared by grinding in air and a much lower adsorptive capacity for polar compounds. The oleophilic graphites according to the invention also had a very much higher capacity for adsorbing n-paraffins than the activated charcoal (Q) which was the one with the highest adsorptive capacity for n-paraffins known to the applicants.

The enhanced oleophilic properties of the oleophilic graphites according to the invention was further demonstrated by measuring the heats of preferential adsorption of n-dotriacontane and n-butyl alcohol on graphites B and P using the Flow Micro-calorimeter as described in Chemistry and Industry, Mar. 20, 1965, pp. 482–489. The results are given in Table 2.

TABLE 2

| Adsorbent | Heat of adsorption from n-Heptane millicalories | |
|---|---|---|
| | n-Dotriacontane | n-Butyl alcohol |
| P | 690 | 830 |
| B | 825 | 39 |

Example II

It was found that the particle shape of oleophilic graphites was considerably different to the particle shape of air-ground graphites. Oleophilic graphites comprised thin, plate-like particles with major dimensions from 0.1 to 5 microns by from 0.1 to 5 microns and from 50 to 200 Angstroms thick. On the other hand air-ground graphites comprised chunky particles with dimensions ranging from 0.1 x 0.1 x 0.1 microns to 0.5 x 0.5 x 0.5 microns.

Example III

It was found that the properties of graphites ground in various media could be classified by determining the hardness of greases made using the graphites. The properties of the greases are shown in Table 3 below.

TABLE 3

| Grinding medium (Ground for 8 hours) | BET Surface area of graphite, m²/g. | Penetration of grease prepared from 17.5% wt. graphite in BG 150/75, mm⁻¹ | |
|---|---|---|---|
| | | Unworked | Worked |
| Air* | 200 | No grease formed | No grease formed |
| n-Pentane | 120 | 294 | 306 |
| n-Hexane | 114 | 287 | 290 |
| n-Heptane | 100 | 272 | 290 |
| n-Octane/n-Heptane min | 125 | 287 | 302 |
| 2,2,4-trimethylpentane ("iso-octane") | 111 | 252 | 276 |
| 2,2,5-trimethylhexane | 113 | 252 | 290 |
| Cyclopentane | 88 | 283 | 298 |
| Cyclohexane | 90 | 276 | 290 |
| Ethylcyclohexane | 102 | 264 | 283 |
| Heptene-3 | 67 | 279 | 298 |
| Octene-1 | 81 | 272 | 290 |
| Octene-2 | 73 | 272 | 283 |
| Di-iso-butylene | 48 | 313 | 331 |
| Toluene | 105 | 264 | 290 |
| Benzene | 103 | 287 | 302 |
| Carbon tetrachloride | 87 | 279 | 298 |

*Ground for 30 minutes only.

In the above experiments a modified Megapact mill was used which was driven by a more powerful motor, the whole mill being mounted on flexible complings of a different design. Greater amplitude of vibration was obtained. The base oil, BG 150/75, was an unblended mineral lubricating oil with a viscosity index of 75 and a Redwood I viscosity at 140° F. (60° C.) of 150 seconds.

From Table 3 it can be seen that oleophilic graphites can form greases whereas air-ground graphites do not form structures in oil. It appears that the branched hydrocarbons, for example, iso-octane, have superior grease thickening properties.

The mill used for the grinding was a vibratory ball mill called by the manufacturer a "Megapact" mill. In the version used the grinding chambers were steel cylinders of 1¼ inch internal diameter by 15 inches long and were nearly filled with a ¼ inch diameter steel balls. The mill was fitted with a one eighth horsepower electric motor and the oscillation could be adjusted from 1 to 5 mm. In operation, each cylinder was filled completely with the n-heptane and the steel balls and 25 to 30 grams of graphite were added. This left about 150 to 200 cc. n-heptane in each cylinder. The ends were then sealed with metal caps fitted with rubber washers and the grinding was carried out. After grinding, the contents of the cylinders were placed in sieves which retained the balls and the n-heptane was removed from the oleophilic graphite by rapid evaporation.

The oleophilic graphites according to the invention are suitable for use as thickeners for high molecular weight organic liquids, unlike graphite ground in air. This use of the oleophilic graphites forms the subject of our copending U.S. patent application Ser. No. 400,243 filed Sept. 29, 1964. Another useful property of the oleophilic graphites is that they can be used as adsorbents for waxy components of petroleum distillates and their dewaxing activity is rather more selective towards waxes than is the case with other graphites. This use of the oleophilic graphites forms the subject of now abandoned U.S. patent application Ser. No. 487,911 filed Sept. 16, 1965.

I claim:

1. An oleophilic graphite with a surface area of from 20 to 800 square meters per gram, prepared by grinding graphite in an organic liquid distilling below 500° C., having a viscosity below 600 centistrokes at 38° C. and having a viscosity below 600 centistokes at 38° C. and hav- 2. A graphite as claimed in claim 1, wherein the organic liquid has a surface tension of from 10 to 40 dynes/cm. at 25° C.

3. A graphite as claimed in claim 1, wherein the organic liquid is a lower molecular weight hydrocarbon.

4. A graphite as claimed in claim 1, wherein the organic liquid is a branched alkyl compound.

5. A graphite as claimed in claim 1, wherein the organic liquid is 2,2,4-trimethylpentane.

6. A graphite as claimed in claim 1, wherein the grinding is carried out in a vibratory ball mill.

7. A graphite as claimed in claim 1, wherein the amount of graphite in the graphite/organic liquid mixture does not exceed 50% wt., based on the weight of mixture.

8. A graphite as claimed in claim 1, wherein the amount of graphite in the graphite/organic liquid mixture is from 2 to 20% wt.

9. A graphite as claimed in claim 1 ground to a surface area of from 30 to 200 square metres per gram.

References Cited

UNITED STATES PATENTS 3,059,769   10/1962   Frost _____ 252—25
3,338,822   8/1967    Groszek _____ 252—25

DANIEL E. WYMAN, Primary Examiner.

I. VAUGHN, Assistant Examiner.